United States Patent
Lee

(10) Patent No.: US 7,290,641 B2
(45) Date of Patent: Nov. 6, 2007

(54) BRAKE DEVICE FOR POWER TOOL

(76) Inventor: Hsin-Chih Chung Lee, No. 21-8, Shang San Cho Woo, Wuchang-Li, Chungli, Tao Yuan Hsien (TW)

( * ) Notice: Subject to any disclaimer, the term of this patent is extended or adjusted under 35 U.S.C. 154(b) by 330 days.

(21) Appl. No.: 11/201,210

(22) Filed: Aug. 11, 2005

(65) Prior Publication Data

US 2007/0034456 A1 Feb. 15, 2007

(51) Int. Cl.
*B62B 9/08* (2006.01)

(52) U.S. Cl. .............. 188/20; 30/216; 30/210; 30/381; 30/382

(58) Field of Classification Search .............. 188/77 R, 188/77 W; 30/380, 216, 210, 381, 382
See application file for complete search history.

(56) References Cited

U.S. PATENT DOCUMENTS

| | | | |
|---|---|---|---|
| 3,101,822 A * | 8/1963 | Clemens | 477/209 |
| 4,793,064 A | 12/1988 | Nagashima | |
| 5,947,866 A * | 9/1999 | Nagashima | 477/200 |
| 6,094,822 A * | 8/2000 | Lange et al. | 30/216 |
| 6,469,269 B1 | 10/2002 | Jong | |
| 6,548,776 B1 | 4/2003 | Jong | |
| 6,575,285 B2 | 6/2003 | Jong | |
| 6,698,566 B2 | 3/2004 | Jong | |

FOREIGN PATENT DOCUMENTS

| | | |
|---|---|---|
| DE | 20 2005001634 | 7/2005 |
| TW | 221936 | 3/1994 |

\* cited by examiner

*Primary Examiner*—Robert A. Siconolfi
*Assistant Examiner*—James K. Hsiao
(74) *Attorney, Agent, or Firm*—Rabin & Berdo, P.C.

(57) ABSTRACT

A brake device for a power tool has a brake assembly, a bearing portion, a pinion and a gearbox. The brake assembly includes a brake base, a cover, a first throttle cable, a second throttle cable, a brake-activating block, a brake-guiding pillar, a brake band and a brake drum. The first throttle cable, the brake-activating block and the second throttle cable are linearly connected together in series. The brake-activating block is designed to abut against the brake-guiding pillar in a brake position and a release position, respectively. With the relative movement among the first throttle cable, the brake-activating block and the brake-guiding pillar, the abutting or separating state between the brake band and the brake drum can be easily controlled.

7 Claims, 5 Drawing Sheets

BRAKE DEVICE FOR POWER TOOL

BACKGROUND OF THE INVENTION

1. Field of the Invention

The present invention relates generally to a brake device for a power tool.

2. The Prior Arts

Many kinds of power tools are already well known, such as portable lawn mowers. In these power tools, an engine drives an output shaft mounted with a tool, such as circular saw and chain saw. When the engine stops, although the engine does not provide any power to the output shaft, the output shaft still rotates awhile due to its inertia. At this time, some undesired things might happen. For example, the tool might further cut the machined work piece and thus influence the machining accuracy thereof, even might injure the operator.

Therefore, in order to reduce the risk of power tools, many kinds of brake device for power tools are proposed, such that the output shaft can be immediately stopped once the engine stops. Taiwan Patent Publication No. 221,936 disclosed a safety brake device for a sawing machine, in which an eccentric device and a brake plate are mounted on a spindle in the casing of the motor. An eccentric plate of the eccentric device drives the brake plate to contact with a bearing of the output shaft of the motor, thereby to achieve the purpose of braking. When the power of the motor is off, the rotational speed quickly slows down and the eccentric force reduces, such that the eccentric plate drives the brake plate to contact with the bearing to cause a friction for braking. Thus, the spindle of the motor can be stopped in a short time.

U.S. Pat. No. 4,793,064 disclosed a brake device for a chain saw, which comprises many components, such as a brake handle, a pivot member, and a brake band. The operator needs to press the brake handle to force the brake band against the output shaft, so as to make the output shaft stop due to the friction between the brake band and the output shaft.

In these brake devices for power tools mentioned above, although the output shaft can be quickly stopped once the engine stops, they still have some problems, such as components numerous, structure complicated, weight and manufacturing cost increased. Further, in U.S. Pat. No. 4,793,064, in order to quickly and completely stop the output shaft after the engine stops, the operator still needs to press the brake handle to stop it that is inconvenient in operating. Thus, it is necessary to provide a brake device for a power tool which is easy to operate, manufacture, and has a simple structure, fewer components, and reduced weight and cost.

SUMMARY OF THE INVENTION

In order to solve the above problems, a brake device for a power tool in accordance with the present invention has a brake assembly, a bearing portion and a pinion, wherein the brake assembly comprises a brake base, a cover, a first throttle cable, a second throttle cable, a locking block, a cable-guiding pillar, a brake-activating block, a brake-guiding pillar, two springs, a brake band and a brake drum. The brake base and the cover define a casing of the brake assembly for receiving the other components of the brake assembly therein. One end of the first throttle cable is connected to a carburetor, and the other end thereof is connected to one end of the brake-activating block. A spring is provided between the first throttle cable and the brake-activating block. One end of the second throttle cable is connected to the throttle, and the other end thereof is connected to the other end of the brake-activating block. As a result, the first throttle cable, the brake-activating block and the second throttle cable are linearly connected together in series. The brake-activating block has two slopes for abutting against the brake-guiding pillar in a brake position and a release position, respectively. The other end of the brake-guiding pillar not contacting with the brake-activating block is connected to the brake band. A spring is provided on the brake-guiding pillar. The length of the brake band is designed to tightly surround the brake drum for stopping the rotation of the brake drum.

When the throttle is closed, the brake-activating block contacts with the brake-guiding pillar in the brake position. At this time, the brake band abuts against the brake drum, such that the brake drum cannot rotate. When the operator pulls the first throttle cable to open the carburetor, such an operation causes the brake-activating block and the second throttle cable to move along the moving direction of the first throttle cable. Thus, the throttle is opened, and the brake-guiding pillar moves along the first slope toward the second slope of the brake-activating block to the release position. In the release position, the brake-activating block pushes the brake-guiding pillar back, such that the tensioned brake band is loosened to release the brake drum to freely rotate with the output shaft. At this time, the power tool is ready for work.

When the operator releases the first throttle cable, namely, closes the carburetor, due to the recovery force of the spring between the first throttle cable and the brake-activating block, the brake-activating block and the second throttle cable are forced to move back. Accordingly, the throttle is closed; and the brake-guiding pillar moves along the second slope back to the first slope of the brake-activating block. The spring pushes the brake-guiding pillar to abut against the first slope of the brake-activating block, such that the brake-guiding pillar and the brake-activating block are moved back to the brake position. Therefore, the brake band tightly surrounds the brake drum again to stop the brake drum and thus the output shaft from rotating due to its inertia.

According to the brake device of the present invention, the brake-activating block connects between the first throttle cable and the second throttle cable. These two throttle cables are used to control the position of the brake-activating block and thus to drive the brake-guiding pillar and the brake band to achieve the effect of braking and the release of braking without additionally providing a braking handle and a pivot member or the like. Therefore, its structure is greatly simplified, and the number of the components, the total weight and the manufacturing cost are reduced. Furthermore, since the brake is simultaneously controlled by the tension of the throttle cables, the operator only needs to release the throttle cables to automatically accomplish the brake without pressing any brake handle. Thus, it is very easy to operate the present invention.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

Hereinafter, a detailed description relating to a brake device for a power tool in accordance with the present invention will be made with reference to the accompanying drawings.

Figure 1:
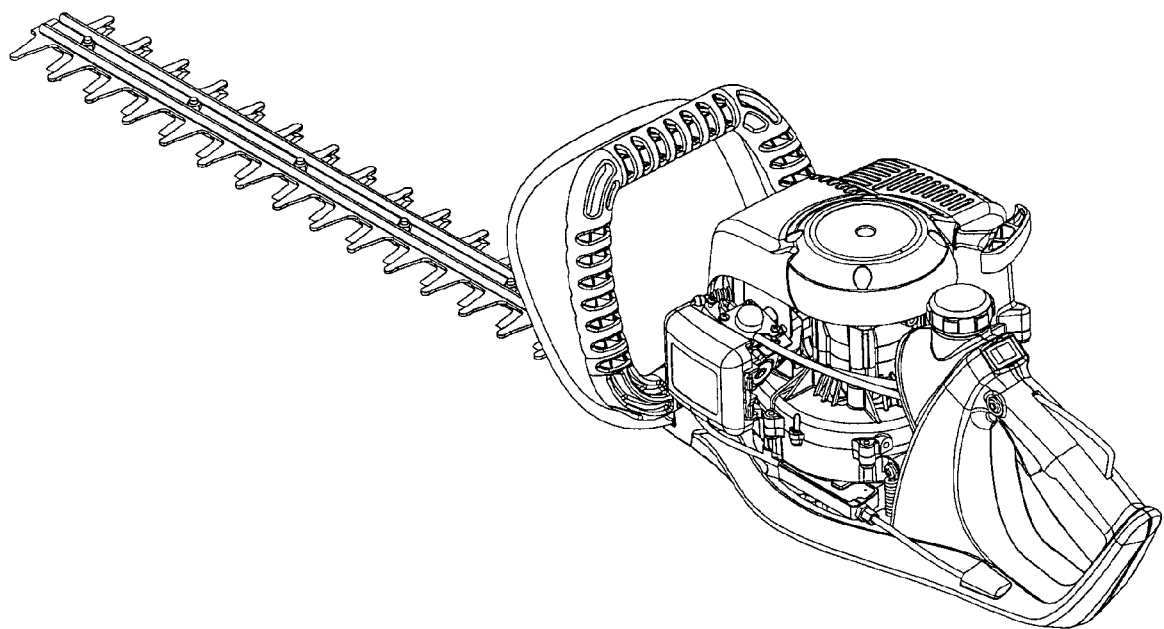
FIG. 1 is a perspective view showing an appearance of a brake device for a power tool in accordance with the present invention.
Figure 2:
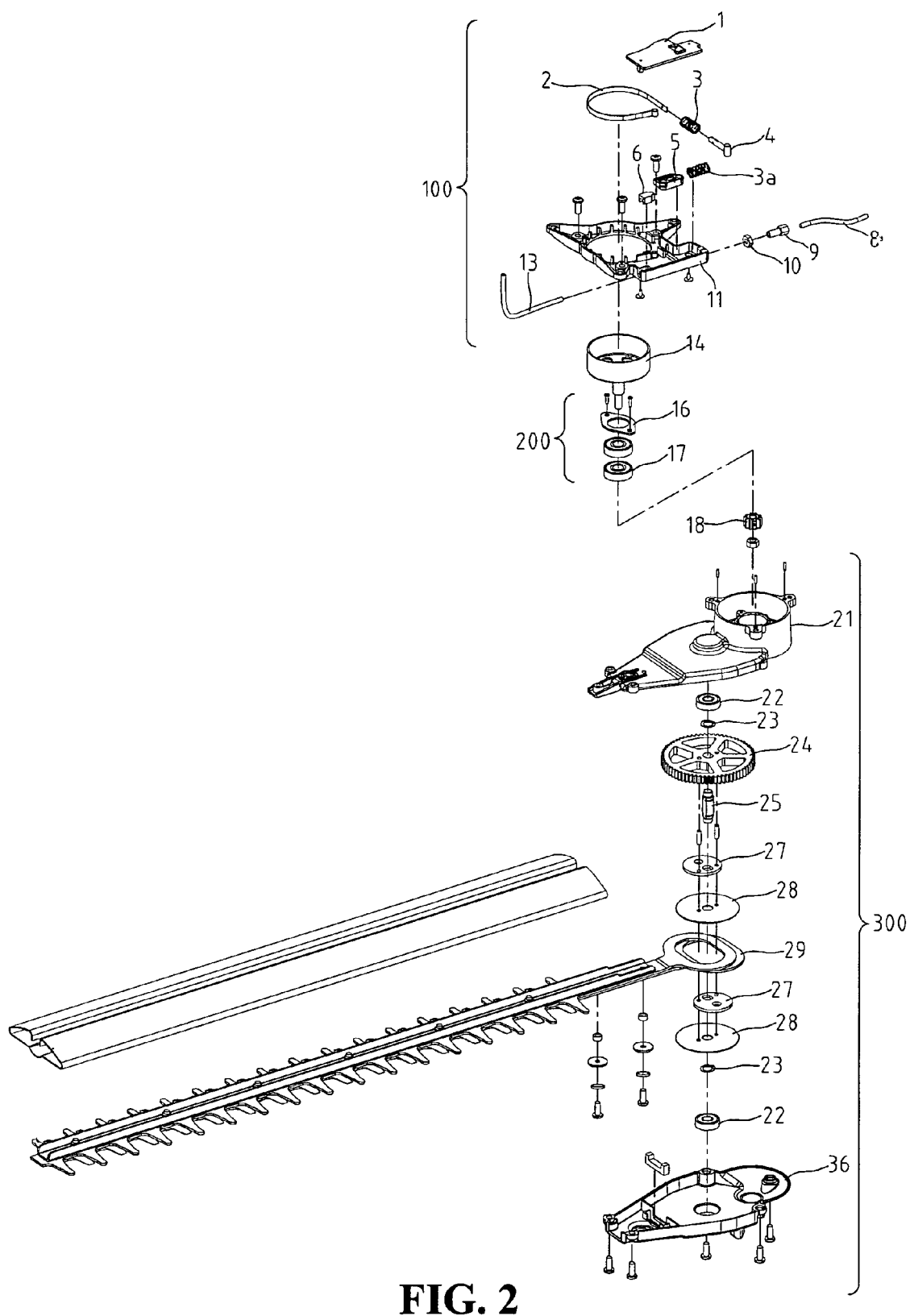
FIG. 2 is an exploded perspective view of the brake device for a power tool of the present invention.

First, with reference to FIGS. 1 and 2, the brake device for a power tool of the present invention comprises a brake assembly 100, a bearing portion 200, a pinion 18 and a gearbox 300. The brake assembly 100 comprises a cover 1, a brake band 2, two springs 3 and 3a, a brake-guiding pillar 4, a brake-activating block 5, a first throttle cable 8, a second throttle cable 13, a locking block 6, a cable-guiding pillar 9, a brake base 11 and a brake drum 14. The cover 1 and the brake base 11 confines a casing of the brake assembly 100 for receiving the other components of the brake assembly therein.

The bearing portion 200 comprises a bearing plate 16, a bearing 17, and a pinion 18. The gearbox 300 comprises an upper cover 21, a bearing 22, a C-shaped retainer 23, a gear 24 and an output shaft 25, an eccentric block 27, a gasket 28 and a lower cover 36. As shown in FIG. 2, a power saw is used as an example to illustrate the present invention. A saw blade assembly 29 is mounted on the output shaft 25. It can be understood that other suitable tools may be also mounted on the output shaft 25, such as a circular saw and a mowing wire. Further, since the bearing portion 200 and the gearbox 300 are not the inventive features of the present invention, other conventional structures can be used. Therefore, the descriptions relating to the bearing portion and the gearbox are omitted in the specification.

Figure 3:
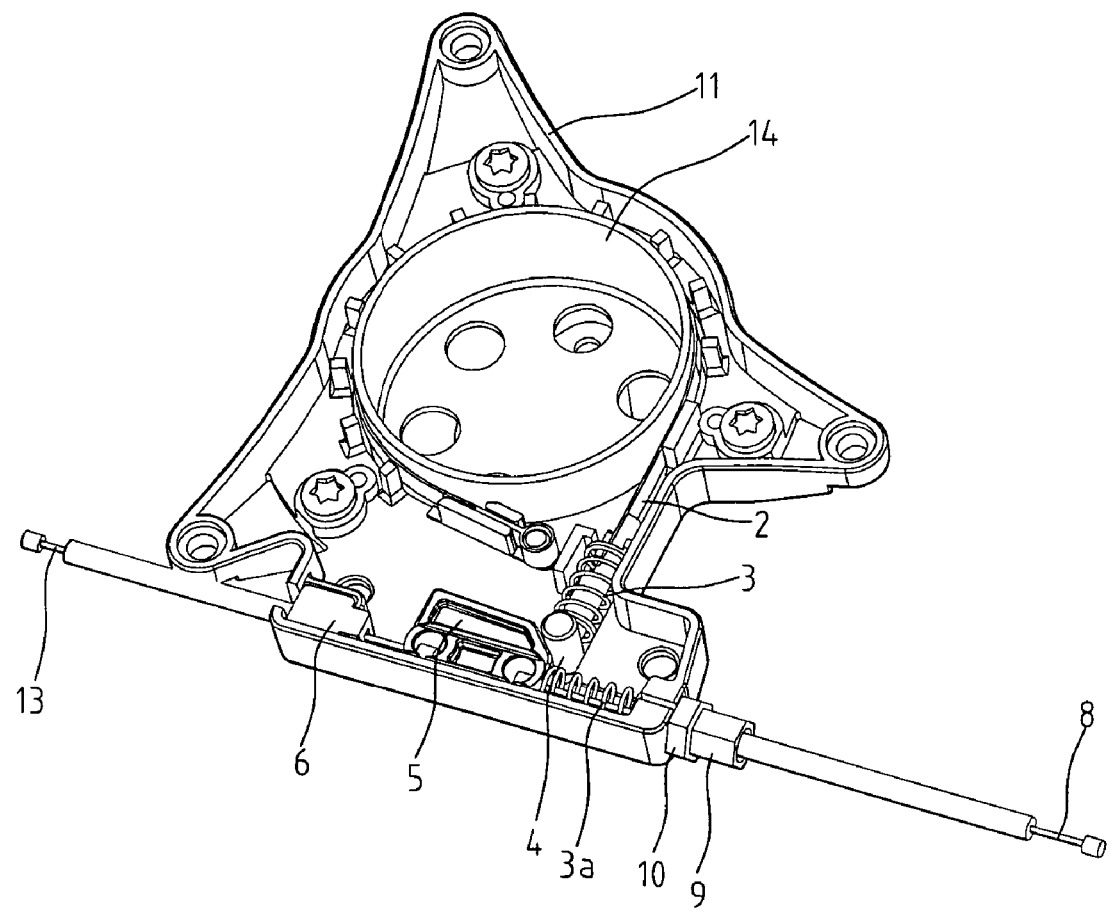
FIG. 3 is a perspective view showing a brake assembly in accordance with the present invention.
Figure 4:
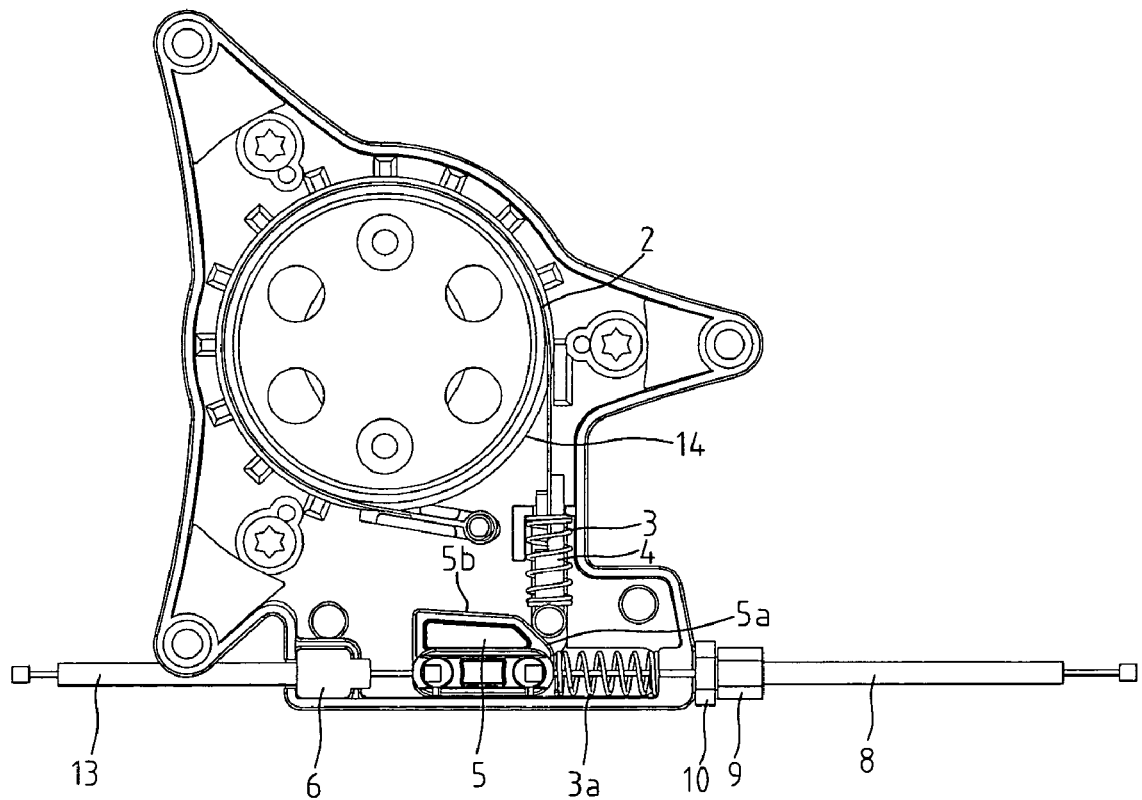
FIG. 4 is a plan view showing the brake assembly of the present invention, which is in a brake position.

Now, the detailed structure of the brake assembly 100 will be described hereinafter. FIG. 3 and FIG. 4 are a perspective view and a plan view, respectively, showing that the brake assembly 100 is in a brake position, in which the cover 1 is removed for better observation. One end of the first throttle cable 8 is connected to a carburetor (not shown), and the other end thereof is connected through a spring 3a to one end of the brake-activating block 5. A cable-guiding pillar 9 and a nut 10 are provided outside the brake assembly 100, such that the first throttle cable 8 can be held on the brake assembly 100 and movable along the direction of the cable-guiding pillar 9. One end of the second throttle cable 13 is connected to a throttle (not shown), and the other end thereof is connected to the other end of the brake-activating block 5. A locking block 6 is provided in the brake assembly 100, such that the second throttle cable 13 can be fixed to the brake assembly 100. As a result, the first throttle cable 8, the brake-activating block 5 and the second throttle cable 13 are linearly connected together in series. The brake-activating block 5 has a first slope 5a and a second slope 5b. The place in which the brake-guiding pillar 4 abuts against the first slope 5a is defined as a brake position, while the place in which the brake-guiding pillar 4 abuts against the second slope 5b is defined as a release position. The other end of the brake-guiding pillar 4 not contacting with the brake-activating block 5 is connected to one end of the brake band 2. The other end of the brake band 2 is fixed to a suitable position on the brake base 11. A spring 3 is provided on the brake-guiding pillar 4. The length of the brake band 2 is designed to tightly surround the brake drum 14 for stopping the rotation of the brake drum 14.

Figure 5:
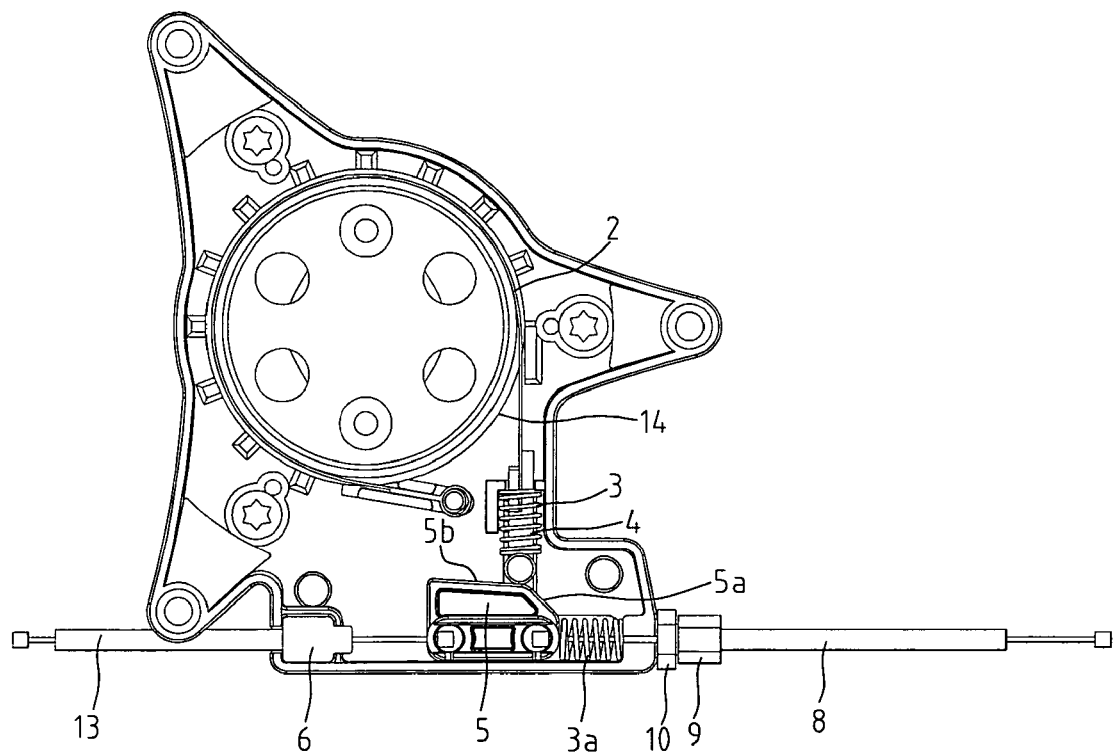
FIG. 5 is a plan view showing the brake assembly of the present invention, which is in a release position.

Next, the operation of the brake assembly 100 will be described. As shown in FIG. 4, when an operator releases the first throttle cable 8, namely, closes the throttle, the first slope 5a of the brake-activating block 5 abuts against the brake-guiding pillar 4 due to the elastic force of the spring 3. At this time, the brake assembly 100 is in the brake position; and the brake band 2 abuts against the brake drum 14 so as to make the brake drum 14 stop. With reference to FIG. 5, when the operator pulls the first throttle cable 8, namely, opens the carburetor, the brake-activating block 5 and the second throttle cable 13 are simultaneously pulled to move along the moving direction of the first throttle cable. Thus, the throttle is opened, and the brake-guiding pillar 4 moves along the first slope 5a toward the second slope 5b of the brake-activating block 5 to the release position. In the release position, the brake-guiding pillar 4 are pushed back by the brake-activating block 5, such that the tensioned brake band 2 is loosened to release the brake drum to freely rotate with the output shaft 25. At this time, the power tool is ready for work.

When the operator releases the first throttle cable 8, namely, closes the carburetor, due to the recovery force of the spring 3a between the first throttle cable 8 and the brake-activating block 5, the brake-activating block 5 and the second throttle cable 13 are forced to move back. Accordingly, the throttle is closed; and the brake-guiding pillar 4 moves along the second slope 5b back to the first slope 5a of the brake-activating block 5. The spring 3 pushes the brake-guiding pillar 4 to abut against the first slope 5a of the brake-activating block 5, such that the brake-guiding pillar 4 and the brake-activating block 5 are moved back to the brake position. Therefore, the brake band 2 tightly surrounds the brake drum 14 again to stop the brake drum 14 and thus the output shaft 25 from rotating due to its inertia.

According to the brake device of the present invention, the brake-activating block 5 connects between the first throttle cable 8 and the second throttle cable 13. These two throttle cables are used to control the position of the brake-activating block 5 and thus to drive the brake-guiding pillar 4 and the brake band 2 to achieve the effect of braking and the release of braking without additionally providing a brake handle and a pivot member or the like. Therefore, its structure is greatly simplified, and the number of the components, the total weight and the manufacturing cost are reduced. Furthermore, since the brake is simultaneously controlled by the tension of the throttle cables, the operator only needs to release the throttle cables to automatically accomplish the brake without pressing any brake handle. Thus, it is very easy to operate the present invention.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. A brake device for a power tool, having a brake assembly, a bearing portion, a pinion and a gearbox, and characterized in that:

the brake assembly comprises a brake base, a cover, a first throttle cable, a second throttle cable, a brake-activating block, a brake-guiding pillar having an end contacting the brake-activating block, a brake band and a brake drum;

the brake drum is connected to the pinion, and the pinion is connected to the gearbox;

one end of the first throttle cable is connected to a carburetor, and the other end thereof is connected through a spring to one end of the brake-activating block;

one end of the second throttle cable is connected to a throttle, and the other end thereof is connected to the other end of the brake-activating block, such that the first throttle cable, the brake-activating block and the second throttle cable are linearly connected together in series;

an end of the brake-guiding pillar not contacting with the brake-activating block is connected to the brake band, and the other end of the brake band is fixed to the brake base; and a spring is provided on the brake-guiding pillar, and the length of the brake band is designed to tightly surround the brake drum for stopping the rotation of the brake drum;

wherein the abutting or separating state between the brake band and the brake drum is able to be controlled by a relative movement among the first throttle cable, the brake-activating block and the brake-guiding pillar.

2. The brake device for a power tool according to claim 1, wherein the brake base and the cover defines a casing of the brake assembly for receiving the other components of the brake assembly therein.

3. The brake device for a power tool according to claim 1, wherein a cable-guiding pillar and a nut are provided outside the brake assembly, such that the first throttle cable is held to the brake assembly and movable along the direction of the cable-guiding pillar.

4. The brake device for a power tool according to claim 1, wherein a locking block is provided in the brake assembly, such that the second throttle cable is fixed to the brake assembly.

5. The brake device for a power tool according to claim 1, wherein the brake-activating block has a first slope and a second slope, and the place in which the brake-guiding pillar abuts against the first slope is defined as a brake position, while the place in which the brake-guiding pillar abuts against the second slope is defined as a release position.

6. The brake device for a power tool according to claim 1, wherein when the brake-guiding pillar is in the brake position, the brake band is tensioned to abut against the brake drum to stop the rotating of the brake drum.

7. The brake device for a power tool according to claim 1, wherein when the brake-guiding pillar is in the release position, the brake band is loosened to release from the brake drum, such that the brake drum is able to freely rotate.

* * * * *